(12) United States Patent
Comey et al.

(10) Patent No.: US 11,195,241 B2
(45) Date of Patent: Dec. 7, 2021

(54) RENTABLE MULTIPURPOSE PRIVATE FACILITY AND METHOD OF USE

(71) Applicants: Scott Comey, Snohomish, WA (US); Dustin Comey, Everett, WA (US)

(72) Inventors: Scott Comey, Snohomish, WA (US); Dustin Comey, Everett, WA (US)

(*) Notice: Subject to any disclaimer, the term of this patent is extended or adjusted under 35 U.S.C. 154(b) by 716 days.

(21) Appl. No.: 15/960,446

(22) Filed: Apr. 23, 2018

(65) Prior Publication Data

US 2018/0276774 A1 Sep. 27, 2018

Related U.S. Application Data

(60) Provisional application No. 62/473,291, filed on Mar. 17, 2017.

(51) Int. Cl.
| | |
|---|---|
| *E04H 3/02* | (2006.01) |
| *G06Q 50/16* | (2012.01) |
| *G06Q 10/02* | (2012.01) |
| *G06Q 30/06* | (2012.01) |
| *E04H 1/06* | (2006.01) |
| *G06Q 20/10* | (2012.01) |

(52) U.S. Cl.
CPC .............. *G06Q 50/16* (2013.01); *E04H 1/06* (2013.01); *E04H 3/02* (2013.01); *G06Q 10/02* (2013.01); *G06Q 20/10* (2013.01); *G06Q 30/0621* (2013.01); *G06Q 30/0645* (2013.01)

(58) Field of Classification Search
CPC .................................. E04H 1/06; E04H 3/02
USPC ......................................................... 52/234
See application file for complete search history.

(56) References Cited

U.S. PATENT DOCUMENTS

| | | | | | |
|---|---|---|---|---|---|
| 4,074,793 | A | * | 2/1978 | Yuter ........................ | E04H 3/04 186/38 |
| 4,274,233 | A | * | 6/1981 | Currier ..................... | E04H 3/02 52/234 |
| 4,602,464 | A | * | 7/1986 | Medel ..................... | E04F 11/00 52/185 |
| 5,775,033 | A | * | 7/1998 | Meehan .................... | E04H 3/04 186/38 |

(Continued)

*Primary Examiner* — Paola Agudelo
(74) *Attorney, Agent, or Firm* — Houda El-Jarrah; Bold IP, PLLC

(57) ABSTRACT

Embodiments for a rentable multipurpose private facility and method of use are provided. The facility includes frontend space, a backend space, a plurality of customization options, and a point-of-sale system. Generally speaking, these components are structured such that the facility includes a frontend space and a backend space with the point-of-sale system located in the frontend space. The method includes displaying information identifying reservation option, reserving a rentable multipurpose private facility, displaying information identifying configuration selection options for the rentable multipurpose private facility, receiving the configuration selection, displaying information identifying payment selection options, receiving payment selection, in response to receiving payment selection, configuring and furnishing the rentable multipurpose private facility according to the configuration selection, displaying information identifying selection of purchasable services and items for the rentable multipurpose private facility, and preserving the configuration selection for continued use at a later date.

3 Claims, 3 Drawing Sheets

(56) References Cited

U.S. PATENT DOCUMENTS

| | | | |
|---|---|---|---|
| 5,806,260 A * | 9/1998 | Quaintance | E04H 3/02 52/234 |
| 8,112,295 B1 | 2/2012 | Parker et al. | |
| 8,713,612 B2 | 4/2014 | Levy et al. | |
| 9,441,387 B1 * | 9/2016 | Seldin | E04H 3/02 |
| 2007/0074471 A1 * | 4/2007 | Gallagher | E04H 3/02 52/236.3 |
| 2007/0260473 A1 * | 11/2007 | Cornacchia | E04H 1/04 705/313 |
| 2009/0216650 A1 | 8/2009 | Salas Peralta | |
| 2011/0041434 A1 * | 2/2011 | Solomon | E04H 3/02 52/234 |
| 2013/0173314 A1 | 7/2013 | Webb et al. | |
| 2016/0326760 A1 | 11/2016 | Seldin | |
| 2017/0175409 A1 * | 6/2017 | Canavati | E04H 4/00 |

* cited by examiner

RENTABLE MULTIPURPOSE PRIVATE FACILITY AND METHOD OF USE

CROSS-REFERENCE TO RELATED APPLICATIONS

This application claims priority to U.S. Provisional Application No. 62/473,291 filed, Mar. 17, 2017. The content of the above application is hereby expressly incorporated by reference herein in its entirety.

FIELD OF DISCLOSURE

This disclosure relates generally to the field of recreational facilities. More specifically, this disclosure relates to a rentable multipurpose private facility and method of use.

BACKGROUND

The hospitality industry is composed of many discrete and typically separate facilities including restaurants, bars, lodging facilities such as hotels and resorts, or entertainment venues such as bowling alleys. Typically, such facilities provide several of such services such as a combined hotel, restaurant, and bar or an arcade offering food service. Some facilities offer private rentable spaces for special occasions such as banquet halls, conference rooms, or private lounges.

Outside of the strictly hospitality context, recently there has been a proliferation of "co-working" spaces as an alternative to traditional office rentals for individuals and small groups wherein single rooms, multi-room units, floors, or even single or single clusters of cubicles are rented for single or recurring periods of time.

SUMMARY

The disclosure presented herein relates to a rentable multipurpose private facility. In one, non-limiting embodiment, the rentable multipurpose private facility may have a frontend space, a backend space, a plurality of customization options, and a point-of-sale system. The facility may also include a frontend space that comprises a food and beverage establishment and a commissary. The facility may also include a backend space that comprises at least one multipurpose enclosed space and a connective corridor connecting each of the at least one multipurpose enclosed space to the frontend space. Also, the plurality of customization options may include furnishings and décor.

The disclosure presented herein also relates to a method of using a rentable multipurpose private facility. In one, non-limiting embodiment, the method may include, under control of a user system, displaying information identifying reservation option, in response to receiving requested reservation for a rentable multipurpose private facility, reserving a rentable multipurpose private facility, displaying information identifying configuration selection options for the rentable multipurpose private facility, receiving the configuration selection, displaying information identifying payment selection options, receiving payment selection, in response to receiving payment selection, configuring and furnishing the rentable multipurpose private facility according to the configuration selection, displaying information identifying selection of purchasable services and items for the rentable multipurpose private facility, and preserving the configuration selection for continued use at a later date.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the Summary above, this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range having a lower limit and an upper limit corresponding to the first number and the second number, respectively. For example, 25 to 100 mm means a range whose lower limit is 25 mm and upper limit is 100 mm.

Figure 1:
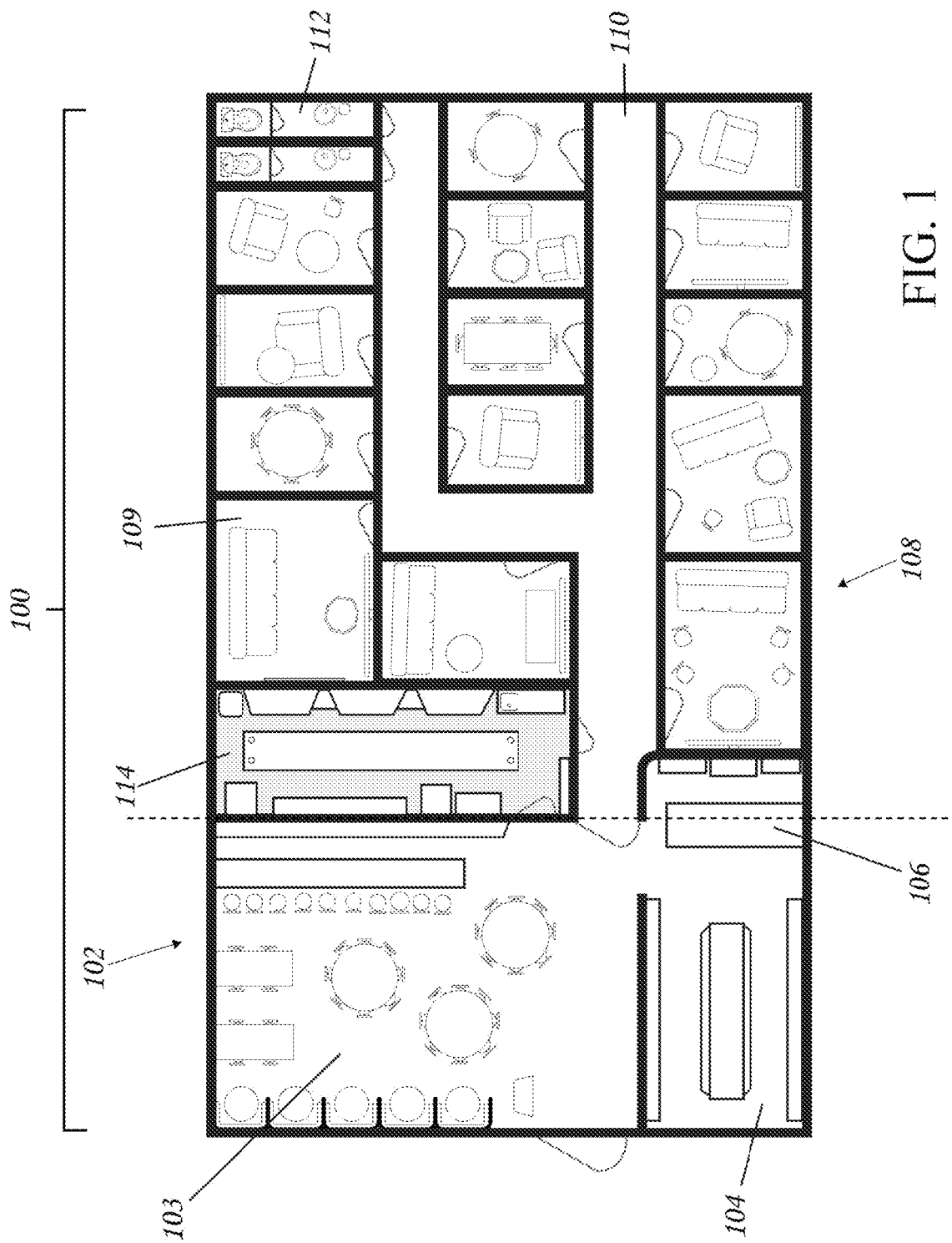
FIG. 1 is an aerial view diagram depicting an embodiment of a facility of rentable multipurpose private facilities.

Referring now to FIG. 1, an aerial view diagram depicts an embodiment of a facility of rentable multipurpose private facilities otherwise known as a "cave" 100. In one, non-limiting embodiment, the cave 100 may have at least two sections. One of the at least two sections may be a frontend space 102 which can be utilized as a food and beverage service establishment such as an alcoholic beverage facility (bar) or a restaurant. The frontend space 102, in one or more embodiments, can include a dining area offering table-side service and a bar area staffed by one or more bartenders. The frontend space 102 may have multiple configurations to accommodate different dine-in settings. In one embodiment, the frontend space 102 may be configured as a casual dining restaurant 103 with counter ordering and pickup with or without table side service. In some embodiments, the frontend space 102 can be utilized for an alcoholic beverage service facility including a surrounding bartender station and optionally including private tables, booths, and lounges. In other embodiments, the frontend space 102 may be utilized for a non-dine-in facility providing only "take-out" or "to-go" services with or without outside delivery and without any dedicated in-house dining provisions.

In one or more embodiments, a commissary 104 can be adjoined to the frontend space 102. The commissary 104 can have a retailer offering for sale incidental items such as toiletries and utensils, pre-packaged foods and beverages, souvenirs and memorabilia, and decorative objects such as pictures, posters, and festive items such a balloons, banners, and party favors. The commissary 104 can have a point-of-sale system 106 to conduct purchasing transactions for the commissary and can be utilized to store devices which can have a computerized rentable multipurpose private facilities software (not shown). The point-of-sale system 106 may include a self-checkout procedure to allow patrons to purchase items from the commissary 104 on their own without assistance using the software (not shown). The software (not shown) can also be used to select pre-defined package options for furnishing, decorating, and supplying the rentable multipurpose private facilities; a means for customizing and purchasing a personalized package for same; and for patrons to select and retrieve as well as alter their previously entered profiles from prior bookings. In one or more embodiments, the commissary 104 is omitted and instead, purchases are made electronically by patrons over the internet. In another embodiment, the cave 100 does not include food and beverage establishments and only include a food preparation kitchen or shared kitchen 114 providing catering.

The cave 100 may also have a backend space 108. In some embodiments, the backend space 108 can have one or more multipurpose enclosed spaces ("enclosed spaces") 109 which can be configured to accommodate various needs. The enclosed spaces 109 may each have a private, securable entranceway or entranceways arrayed in a connective corridor 110 as needed. Further, the enclosed spaces 109 may be utilized as restrooms 112 at a suitable location within the backend space 108. The enclosed spaces 109 may also be occupied by individuals or groups on a shared-time scheme coordinated by a central point-of-sale system 106 which provides options, for example, for rental duration, purchased or rented amenities such as furnishings and electronic entertainment devices, decoration schemes, and food and beverage catering options. In some embodiments, the cave 100 can be decorated with patrons' personal belongings, including décor and furniture. For instance, if preset customization options available through the central point-of-sale system 106 do not meet the desires or requirements of patrons, the patrons may bring in personal or outside furnishings to fully customize the cave 100 space. The enclosed spaces 109 may be all of the same or similar size and dimensions, or may be offered in a variety of configurations including various options for windows, terraces, and lighting options. The enclosed spaces 109 may also be configured as garages, with one or more walls adjacent to the outside of the facility opening completely or nearly completely to allow for vehicles, large equipment, or large groups of patrons to enter and use the space for purposes suitable to such a space. The connective corridors 110 may also lead to facilities for restrooms, common wash areas, mini-storage facilities such as lockers for patrons to store personal items, and vending facilities for personal items and snack foods and beverages within the backend space 108.

In one or more embodiments, a shared kitchen 114 area may be included which can be used as the food preparation facility for both the frontend space 102 as well as catering for the enclosed spaces 109 within the backend space 108. In some embodiments, the enclosed spaces 108 can be private rentable multipurpose rooms of varying sizes and configurations and which can be furnished, decorated, and supplied with previously selected packages purchased and coordinated from the point-of-sale system 106. In some embodiments, the cave 100 may include fixed, unchangeable, or immovable features including lighting, fixtures, and furniture in both the frontend space 102 and the backend space 106. The cave 100 may also have restrooms 116 or bathroom facilities servicing the frontend space 102 and the backend space 108. In other embodiments, each of the enclosed spaces 109 may have its own restroom facilities, kitchen or kitchenettes, and appliances such as refrigerators and ovens for increased privacy and self-sufficiency. In another embodiment, the cave 100 includes a large entryway such as a garage door connecting to the outside of the facility. Such a configuration allows for mixed indoor and outdoor usage of the cave 100 such as for outdoor parties utilizing the indoor portion of the cave 100 including the frontend space 102 and the backend space 104 for holding tables for food and beverages and media devices for sound, or motorcycle enthusiasts who may bring their motor vehicles into the spaces.

Figure 2:
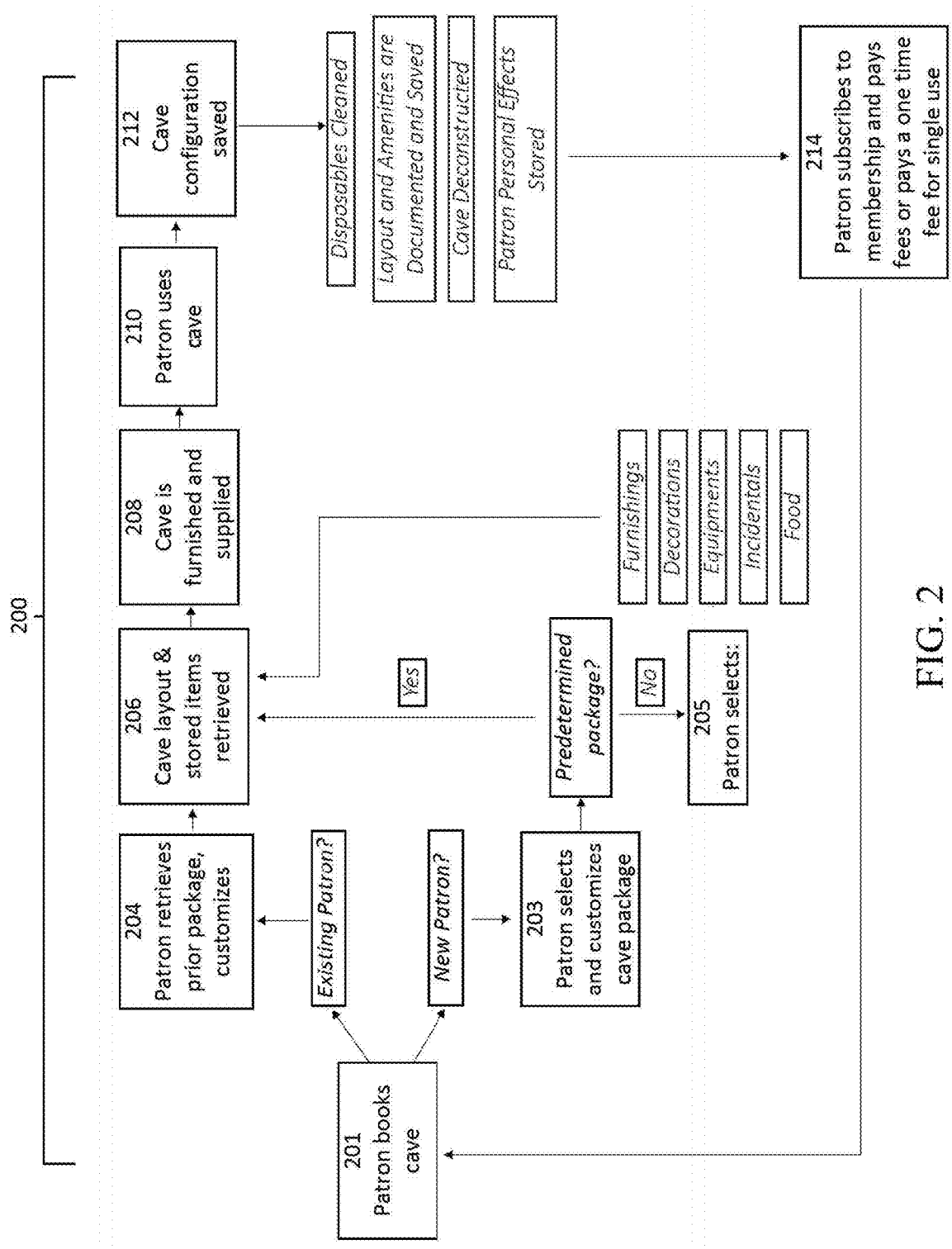
FIG. 2 is a flowchart depicting an embodiment of a method of use for the rentable multipurpose private facilities.

Referring now to FIG. 2, a flowchart is shown depicting a method of use 200 for the rentable multipurpose private facilities. In step 201, a prospective patron books a space on any one of a selection of scheduling options such as a time share or as a single booking through a computer system either at home through a personal computer device or on the premises of the rentable multipurpose private facilities. If the patron is new, the patron is then presented a choice of a multiplicity of options for cave configurations including furnishing, decorating, and supplying the space for the desired use including but not limited to: furniture (couches, chairs, tables, end tables, stand lights, rugs and carpets, etc.), decorations (framed pictures, posters, or memorabilia; additional lighting fixtures; wall draping and coverings; display tables for personal effects; etc.), room layout adjustments (temporary walls or dividers), equipment (media centers, projectors, television sets, gaming consoles, speaker setups, etc.), incidentals (hygiene or grooming products, eating utensils, etc.), and food catering package options or an a la carte election. These options may be offered in the form of predetermined packages (the "football game package", the "dollhouse package", the "poker game package", etc.) with customization options. A patron may also choose to forego the predetermined package options and opt for a completely open choice format or a la carte options where patrons can select, any combination of available products and services to load out their space. In other embodiments, patrons can select a personal effects option and furnish each cave 100 or enclosed spaces 109 of the backend space 108 with their own memorabilia, furniture, or other personal belongings for a truly personal customization. For instance, if the cave 100 does not include personalization options in regards to style of furniture or décor to fit the tastes and preferences of the patron(s), the patron(s) may forego the preset or available customization options and use and furnish or decorate the cave to match preferences. In step 205, a patron can select from a variety of options of furnishings, decorations, food, etc.

Once a cave layout is chosen by a patron from a predetermined package, an à la carte option, or a personal effects option, the cave 100 layout is then retrieved in step 206. Returning or existing patrons may retrieve saved load-outs and packages for use in step 204 including the option to make changes to same. Both returning and new patrons may optionally select from a pre-packaged choice or choices with optional personalization elections. Upon selection of choices, and prior to the start of said patron's booked usage time, the space is assembled using the combination of chosen furniture, décor, incidentals, equipment, and food and supplies in step 208 and the patron is free to use the cave as desired in step 210. In the case of a new patron, the chosen package can be utilized to construct the space de novo. In the case of a returning patron, if a previously stored loadout is chosen with or without modifications, the previously stored panoramic image and manifest can be retrieved on a suitable display device such as a camera-equipped smartphone or tablet. Once the cave configuration 212 has been saved, the patron can subscribe for membership and continue to return based on a membership subscription fee or a onetime fee for single use.

In some embodiments, rentable multipurpose private facilities are leased to one patron or group of patrons exclusively such that said patron(s) have unrestricted access to the space during specified hours of operation and furnishings, décor, and items stored therein are left undisturbed for the duration of the rental agreement. In these embodiments, no digital photographing of the spaces for takedown and re-setup is employed. In other embodiments, rentable multipurpose private spaces may be booked under a time share model for recurring patrons and an ad hoc use model for serial single usage patrons.

Figure 3:
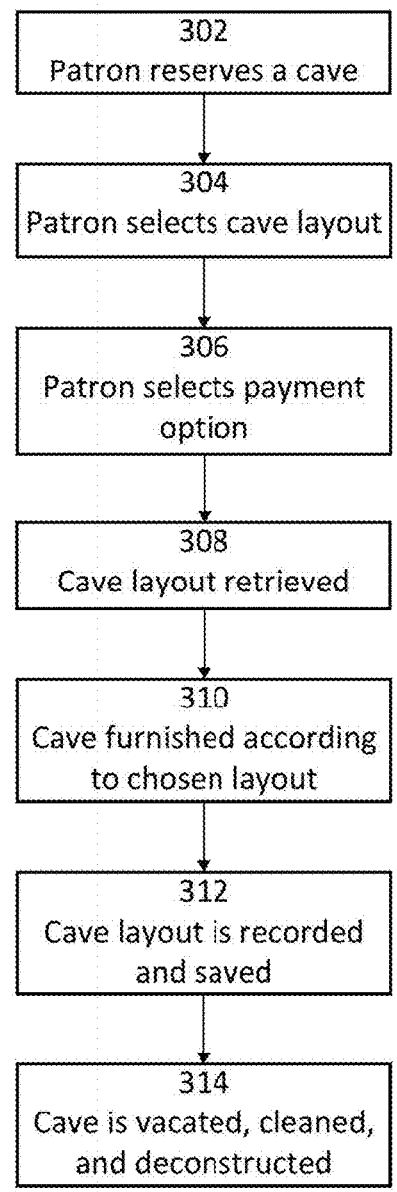
FIG. 3 is flow diagram depicting another embodiment of a method of use for the rentable multipurpose private facilities.

Referring now to FIG. 3, a flow diagram is shown depicting a method of use 300 for the rentable multipurpose private facilities. In the first step 302, a patron or a group of patrons may reserve a cave space. In the second step 304, the patron(s) may select a cave layout or package from a multiplicity of options for furnishing, decorating, and supplying the space for the desired use including but not limited to: furniture (couches, chairs, tables, end tables, stand lights, rugs and carpets, etc.), decorations (framed pictures, posters, or memorabilia; additional lighting fixtures; wall draping and coverings; display tables for personal effects; etc.), room layout adjustments (temporary walls or dividers), equipment (media centers, projectors, television sets, gaming consoles, speaker setups, etc.), incidentals (hygiene or grooming products, eating utensils, etc.), and food catering package options or an a la carte election. These options may be offered in the form of predetermined packages (the "football game package", the "dollhouse package", the "poker game package", etc.) with customization options. A patron may also choose to forego the predetermined package options and opt for a completely open choice format where patrons can select any combination of available products and services to load out their space. In the third step 306, after the cave layout or package has been selected, the patron(s) select and submit a form of payment by selecting to subscribe to a membership that allows the patron(s) to use the cave again in the future without having to pay with each visit, or by selecting a single-use fee, which can be set as a flat fee. In the fourth step 308, the layout or package may be retrieved and in the fifth step 310 the cave may be furnished, decorated, and supplied according to the patron's or patrons' preferences. In the sixth step 312, the cave configuration can be recorded and saved using a camera. The camera may comprise any camera or series/combination of cameras which capture a complete or nearly complete 360 by 180 degree panoramic image of the space. A captured image or images, combined with a detailed manifest of patron-selections, choices, and preferences is used to recreate the room on-demand for each patron or patrons for future dates of occupancy. In the seventh step 314, the cave is cleaned and deconstructed once the cave is vacated.

An augmented reality application, which may be running on a computer device such as a smart phone, can be used to render the saved image in a live overlay on the device such that the user can determine the placement of items in the space by swiveling the device about the room in real time. The detailed manifest of selections, preferences, and items is utilized to reconstruct the space to the patron's previous selections incorporating any updates or changes made by the patron.

In some embodiments, rentable multipurpose private spaces may be booked for single events as day- or hourly-rentals. One example scenario in which the rentable multipurpose private spaces may be utilized is by small group of patrons who book a private space for use as second "living room" in order to host sporting event viewing parties. Furnishings and amenities appropriate to such usage are chosen by the patrons including a media entertainment center comprised of a television, a cable television tuner unit ("cable box"), a set of surround sound speakers arranged around the four corners of the room both proximate to the floor and hung from the ceiling, and a miniature refrigerator for storing and cooling beverages. Incidentals appropriate to such use are selected and purchased by the patrons including beverages which are stored in the above refrigerator; a catered assortment of appropriate foods such as chicken wings, popcorn, and pizza; a set of disposable plates, cups, napkins, and utensils; and a pay-per-view sporting event program. The patrons select for additional décor framed large format posters of iconic figures from chosen sports and teams as well as name and mascot-emblazoned memorabilia which are hung on the walls of the space. A preferred lighting placement and scheme is also chosen with preselected options programmed into a remote control mechanism including dim for optimal television viewing, partial dim in which the wall supporting said television is darkened while the tables holding the above catered foods are partially illuminated, and full illumination for when attention is to be focused away from the television. In the above exemplary scenario, upon arrival, the patrons also bring a number of their own personal items including a coat rack, several pieces of personal sports collectables, and a gaming console with cables and wireless controllers. The patrons make use of the space for viewing a recurring scheduled sporting tournament and for several hours before and after same for pre- and post-game festivities. After the patrons have vacated for their first usage, one or more employees of the facility perform standard clean-up of the room such as vacuuming and removal of debris, after which a 360 degree camera is brought into the space and a digital panoramic photograph or series of photographs is taken highlighting the placement of memorabilia, furnishings, equipment, and decorative items. All such items are then removed with patron personal effects carefully itemized, catalogued, and stored on- or off-site. A detailed manifest of all selected features is made such as lighting schemes, chosen sports event package, and menu choices. When this same group of patrons books their next usage, the above panoramic photographs rendered on a proprietary mobile software application such as Google Tango (a trademark of Google, Inc.) and the detailed manifest are used to carefully reconstruct the room to a nearly identical but cleaned and sanitized state to that in which it was left previously along with replenishment of chosen food items and incidentals, creating the illusion that the space was just as the patrons left it save for ordinary housekeeping.

In other embodiments, spaces may be booked and furnished according to generic package options specific to certain themes and events. Selection of specific decorations, furnishings, and food and incidentals can be made immediately prior to the start of the booking time subject with choices made according to present availability within a set of parameters. Said themes and events may include viewing of specific tournaments and the theme may be tailored towards memorabilia, signage, and color combinations specific to a particular sports team chosen by the patron. Said themes and events may also include special occasions such as birthdays wherein decorations, incidentals, food, and loadout are chosen for the individual or individuals subject to the special occasion.

The rentable multipurpose private facilities and method may be used by a variety of patrons for a variety of uses. Single patrons may create a space that can serve as a personal relaxation, meditation, or workout room. Groups of patrons may utilize a larger space for recurring group activities such as hobbyists who book a garage-style space for model vehicle showcasing or programmable robotics creation, groups focused on shared interests such as collectibles who use such spaces as showrooms and meeting venues, groups who engage in parlor, card, or tabletop games, and the like.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

While embodiments have been illustrated and described, as noted above, many changes can be made without departing from the spirit and scope of the RENTABLE MULTIPURPOSE PRIVATE SPACES AND METHOD OF USE. Accordingly, the scope of the RENTABLE MULTIPURPOSE PRIVATE SPACES AND METHOD OF USE not limited by the disclosure of these preferred and alternate embodiments. Instead, the scope of the invention title be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

What is claimed is:

1. A rentable multipurpose private facility, consisting of:
   an enclosed frontend space comprising a food and beverage establishment;
   at least one enclosed backend space distinct from the enclosed frontend space;
   at least one corridor connecting the frontend space and the at least one backend space;
   at least one restroom accessible from the frontend space, the at least one backend space and/or the at least one corridor;
   a plurality of backend space customization options; and
   an electronic self-serve point-of-sale system adapted to offer the plurality of backend space customization options to a first user for a first reservation, to receive a first reservation from a first user for a first at least one enclosed backend space, the first reservation including a first one of the plurality of backend space customization options chosen by the first user, and to store first information regarding the first reservation and the first one of the plurality of backend space customization options chosen by the first user for the first reservation; and
   a camera system adapted to capture one or more images of the first one of the plurality of backend space customization options implemented during a date of the first reservation and to provide the one or more images to the self-serve point-of-sale system prior to a date of the second reservation;
   wherein at least some of the plurality of customization options include furnishing and décor options.

2. A rentable multipurpose private facility consisting of:
   an enclosed frontend space comprising a food and beverage establishment;
   at least one enclosed backend space distinct from the enclosed frontend space;
   at least one corridor connecting the frontend space and the at least one backend space;
   at least one restroom accessible from the frontend space, the at least one backend space and/or the at least one corridor;
   a plurality of backend space customization options;
   an electronic self-serve point-of-sale system adapted to offer the plurality of backend space customization options to a first user for a first reservation, to receive a first reservation from a first user for a first at least one enclosed backend space, the first reservation including a first one of the plurality of backend space customization options chosen by the first user, and to store first information regarding the first reservation and the first one of the plurality of backend space customization options chosen by the first user for the first reservation; and
   one or more temporary walls and/or dividers adapted for use in implementing the first one of the plurality of backend customization options during a date of the first reservation;
   wherein at least some of the plurality of customization options include furnishing and décor options.

3. A rentable multipurpose private facility consisting of:
an enclosed frontend space comprising a food and beverage establishment;
at least one enclosed backend space distinct from the enclosed frontend space;
at least one corridor connecting the frontend space and the at least one backend space;
at least one restroom accessible from the frontend space, the at least one backend space and/or the at least one corridor;
a plurality of backend space customization options;
an electronic self-serve point-of-sale system adapted to offer the plurality of backend space customization options to a first user for a first reservation, to receive a first reservation from a first user for a first at least one enclosed backend space, the first reservation including a first one of the plurality of backend space customization options chosen by the first user, and to store first information regarding the first reservation and the first one of the plurality of backend space customization options chosen by the first user for the first reservation; and
an augmented reality application adapted to design at least one of the plurality of backend space customization options.

* * * * *